(12) United States Patent
Mashio et al.

(10) Patent No.: US 11,191,614 B2
(45) Date of Patent: Dec. 7, 2021

(54) METHOD OF FORMING A DENTAL PROSTHESIS

(71) Applicant: GC CORPORATION, Shizuoka (JP)

(72) Inventors: Go Mashio, Tokyo (JP); Tatsuya Fujimoto, Tokyo (JP); Hayato Yokohara, Tokyo (JP); Tomohiro Hoshino, Tokyo (JP); Toshihiko Azuma, Tokyo (JP)

(73) Assignee: GC CORPORATION, Shizuoka (JP)

( * ) Notice: Subject to any disclaimer, the term of this patent is extended or adjusted under 35 U.S.C. 154(b) by 392 days.

(21) Appl. No.: 15/784,796

(22) Filed: Oct. 16, 2017

(65) Prior Publication Data

US 2018/0110586 A1 Apr. 26, 2018

(30) Foreign Application Priority Data

Oct. 21, 2016 (JP) ............................. JP2016-207028

(51) Int. Cl.
| | | |
|---|---|---|
| *A61C 13/00* | (2006.01) | |
| *B24B 1/00* | (2006.01) | |
| *A61C 3/06* | (2006.01) | |
| *B24B 29/02* | (2006.01) | |

(52) U.S. Cl.
CPC ............ *A61C 3/06* (2013.01); *A61C 13/0006* (2013.01); *A61C 13/0022* (2013.01); *B24B 29/02* (2013.01); *A61C 13/0004* (2013.01); *B24B 1/00* (2013.01); *Y10T 29/49567* (2015.01)

(58) Field of Classification Search
CPC ... A61C 3/06; A61C 13/0022; A61C 13/0006; A61C 13/0004; B24B 29/02; B24B 1/00; B24B 3/02; B24B 3/24; B24B 3/26; B24B 3/34; B24B 3/60; B24B 3/605; B24B 53/04; B24B 53/53; Y10T 29/49567; Y10T 29/49568; Y10T 29/49995; Y10T 29/49996; Y10T 29/49998
USPC ............................................. 451/45, 56, 443
See application file for complete search history.

(56) References Cited

U.S. PATENT DOCUMENTS

| | | | | |
|---|---|---|---|---|
| 4,773,186 A | | 9/1988 | Kojima | |
| 5,168,661 A | * | 12/1992 | Pedersen | B23Q 1/4857 451/11 |
| 6,589,144 B1 | * | 7/2003 | Ebihara | A61C 13/0004 483/55 |

(Continued)

FOREIGN PATENT DOCUMENTS

| | | |
|---|---|---|
| DE | 41 35 823 C2 | 7/1994 |
| DE | 37 21 013 C2 | 4/1995 |

(Continued)

*Primary Examiner* — Sarang Afzali
(74) *Attorney, Agent, or Firm* — Sughrue Mion, PLLC

(57) ABSTRACT

A processing machine and a method of using the processing machine to process a block to form a dental prosthesis is provided. The processing machine includes a polishing jig. The polishing jig is for machining tools which makes it possible for a deteriorating machining tool to be used again without detaching the machining tool, with which the processing machine is equipped, from the processing machine. The polishing jig for machining tools comprises an attachment part to be attached to the processing machine; and a polishing face that is at least part of a surface of the polishing jig, the polishing face adapted to polish a processing part of a machining tool.

1 Claim, 14 Drawing Sheets

(56) References Cited

U.S. PATENT DOCUMENTS

| | | | |
|---|---|---|---|
| 7,144,305 B2 * | 12/2006 | Toyoshima | B24B 13/005 451/44 |
| 7,950,131 B2 * | 5/2011 | Hilliard | A61C 7/08 29/564 |
| 9,155,598 B2 * | 10/2015 | Niewiadomski | A61C 13/0009 |
| 10,532,439 B2 * | 1/2020 | Barensteiner | B24B 3/24 |
| 2006/0141250 A1 | 6/2006 | Basler et al. | |
| 2006/0292527 A1 | 12/2006 | Basler et al. | |

FOREIGN PATENT DOCUMENTS

| | | |
|---|---|---|
| DE | 103 30 758 A1 | 2/2005 |
| DE | 10 2004 063 417 A1 | 7/2006 |
| JP | 10-277059 A | 10/1998 |

* cited by examiner

METHOD OF FORMING A DENTAL PROSTHESIS

FIELD

The present invention relates to polishing jigs for machining tools, methods of polishing machining tools, and methods of producing dental prostheses.

BACKGROUND

In a dental field, for recovering patients' oral functions which are lost by loss of natural teeth, the following treatment is given: a dental prosthesis whose shape is copied from a shape of a tooth is artificially produced, and the produced dental prosthesis is worn inside an oral cavity, to recover patient's oral functions.

It is becoming more common to use a CAD/CAM (computer-aided design/computer-aided manufacturing) technique for producing such dental prostheses. A CAD/CAM technique is to design and digitize a desired shape of a dental prosthesis using a computer, after that, send electronic data of the designed shape to a processing machine, and automatically process to obtain the desired shape of a dental prosthesis based on the data using the processing machine.

There are some processing methods according to CAM. One of these methods is a method of equipping a processing machine with a machining tool such as a drill and a burr, and automatically cutting or grinding an unprocessed object called a blank, a block or the like based on data, and processing the unprocessed object to have a shape of a dental prosthesis (for example, see Patent Literature 1).

CITATION LIST

Patent Literature

Patent Literature 1: JP H 10-277059A

SUMMARY

Technical Problem

One problem with processing using a machining tool is that a machining tool is gradually deteriorating and its cutting performance is becoming worse as processing is performed, and finally cutting cannot be performed. In recent years, dental prostheses of a high strength have been demanded, and materials of a high strength such as zirconia and glass ceramics have been often employed as unprocessed objects, which especially makes the problem of deterioration of a machining tool remarkable.

If a machining tool deteriorates, this deteriorating machining tool has to be replaced with new one. It is a problem that such replacement costs a lot, and requires some effort and time.

An object of the present invention is to provide a polishing jig for machining tools which makes it possible for a deteriorating machining tool to be used again without detaching the machining tool, with which a processing machine is quipped, from the processing machine.

Solution to Problem

As a result of intensive studies of the inventors of the present invention for solving the above described problems, they found that a machining tool is polished to be able to be used again because according to a polishing jig for machining tools comprising: an attachment part to be attached to a processing machine; and a polishing face that is at least part of a surface of the polishing jig, the polishing face adapted to polish a processing part of a machining tool, the polishing jig can be easily attached to the processing machine, and the machining tool can be polished by operating the processing machine, and driving the processing part of the machining tool with which the processing machine, which deteriorates and cutting performance of which worsens, is equipped onto the polishing face of the polishing jig. Then, the inventors completed the present invention.

That is, the present invention is a polishing jig for machining tools comprising: an attachment part to be attached to a processing machine; and a polishing face that is at least part of a surface of the polishing jig, the polishing face adapted to polish a processing part of a machining tool.

Advantageous Effects of Invention

Using the polishing jig for machining tools according to the present invention makes it possible for a machining tool which deteriorates and a cutting performance of which worsens to be used again without detaching the machining tool from a processing machine.

DETAILED DESCRIPTION OF EMBODIMENTS

Hereinafter a polishing jig for machining tools according to one embodiment of the present invention will be described in more detail with reference to the drawings. The present invention is not restricted to this embodiment.

Figure 1:
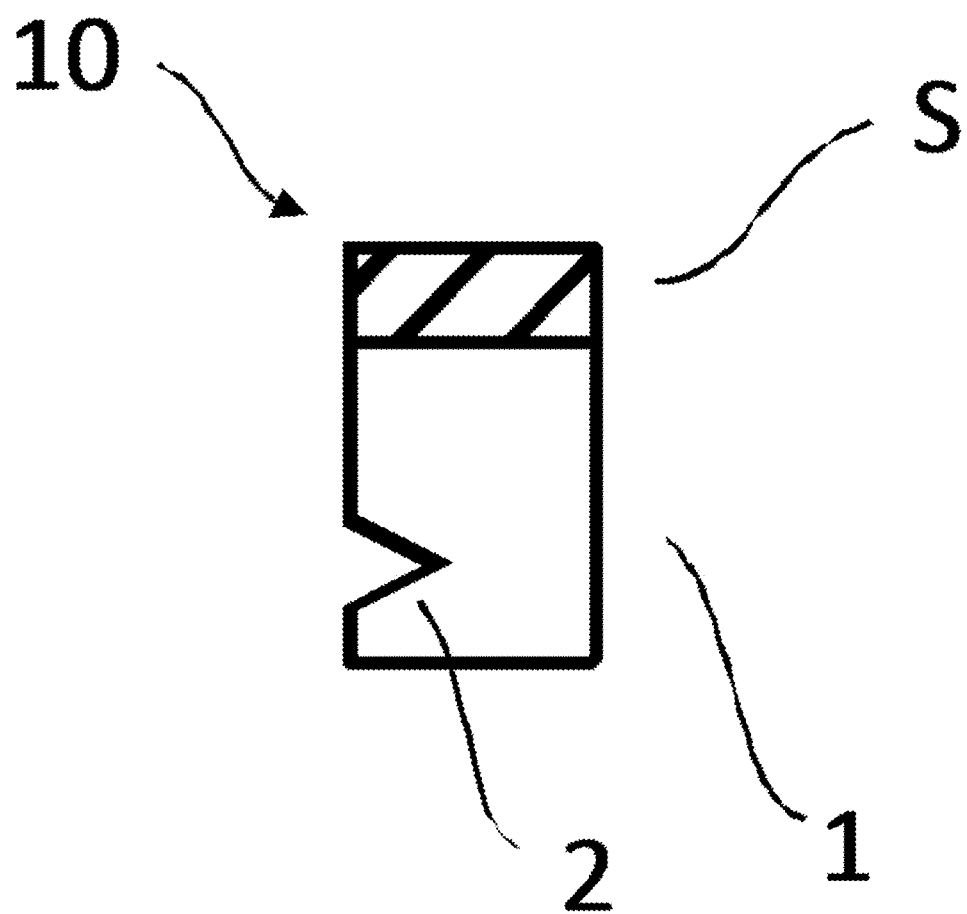
FIG. 1 is an explanatory view showing one embodiment of a polishing jig for machining tools according to the present invention.

As shown in FIG. 1, a polishing jig 10 for machining tools has an attachment part 1. In addition, the polishing jig 10 has a polishing face S at least on part of its surface. Here, in the drawing, a portion corresponding to the polishing face is represented by oblique lines.

The attachment part 1 is a part to be attached to a processing machine M. By the attachment part, the polishing jig 10 for machining tools is fixed to the processing machine M. A shape of the attachment part 1 is not restricted. For example, this shape can be columnar, or be a polygonal column. A material of the attachment part 1 is not restricted as well. This material is preferably hard one such as metal. Examples of this material include iron, aluminum, and brass. The attachment part may be one member, or may be composed of at least two members. A fixing method by the attachment part is not restricted. Examples of this method include bonding, welding, and fitting.

Figure 2:
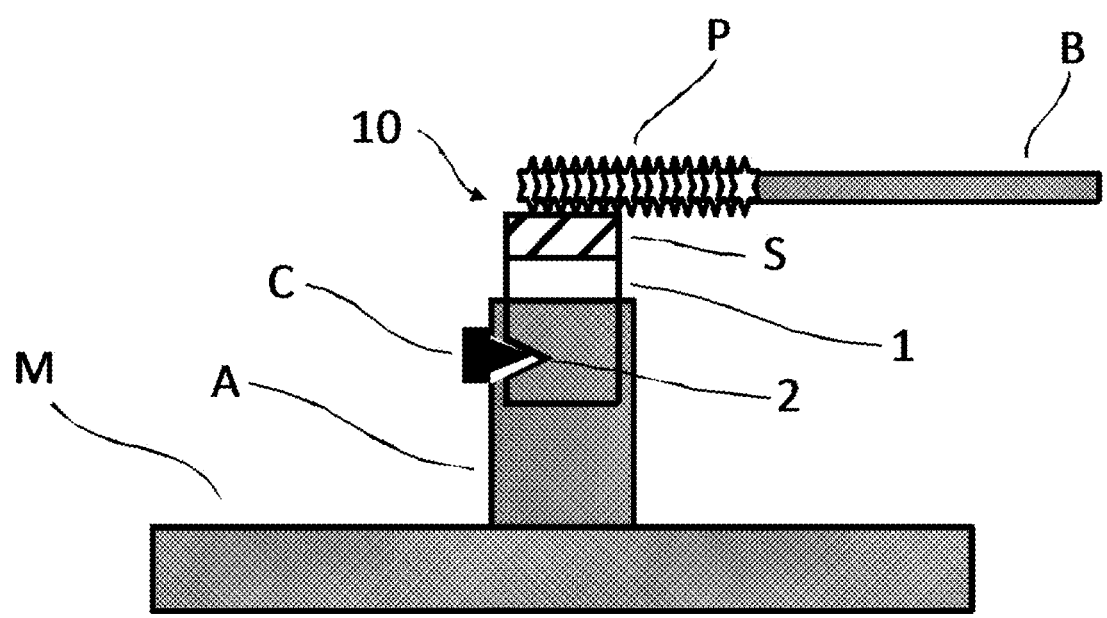
FIG. 2 is an explanatory view showing a state where a polishing face of the polishing jig for machining tools according to the present invention is polished by a processing part of a machining tool.

Preferably, a holding part 2 is further formed in the attachment part 1. A shape of the holding part 2 is not restricted. Examples of the holding part is a concave part and a convex part. As shown in FIG. 2, formation of the holding part 2 makes it possible to more firmly fix the polishing jig 10 for machining tools to a fixation part A of the processing machine M by tightening a chuck C such as a screw when the polishing jig 10 is fixed to the fixation part A.

Figure 3:
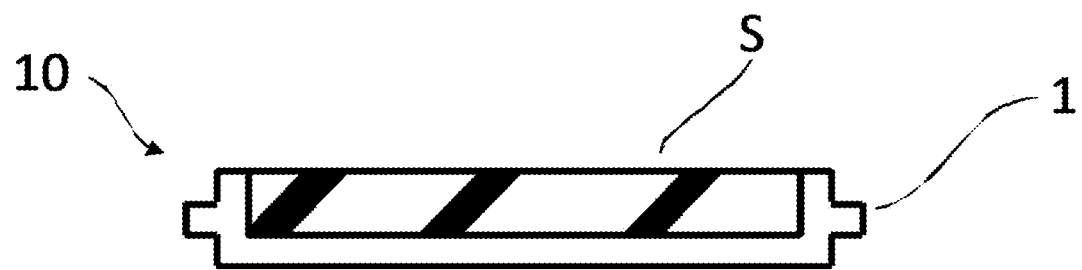
FIG. 3 is an explanatory view showing another embodiment of the polishing jig for machining tools according to the present invention.
Figure 4:
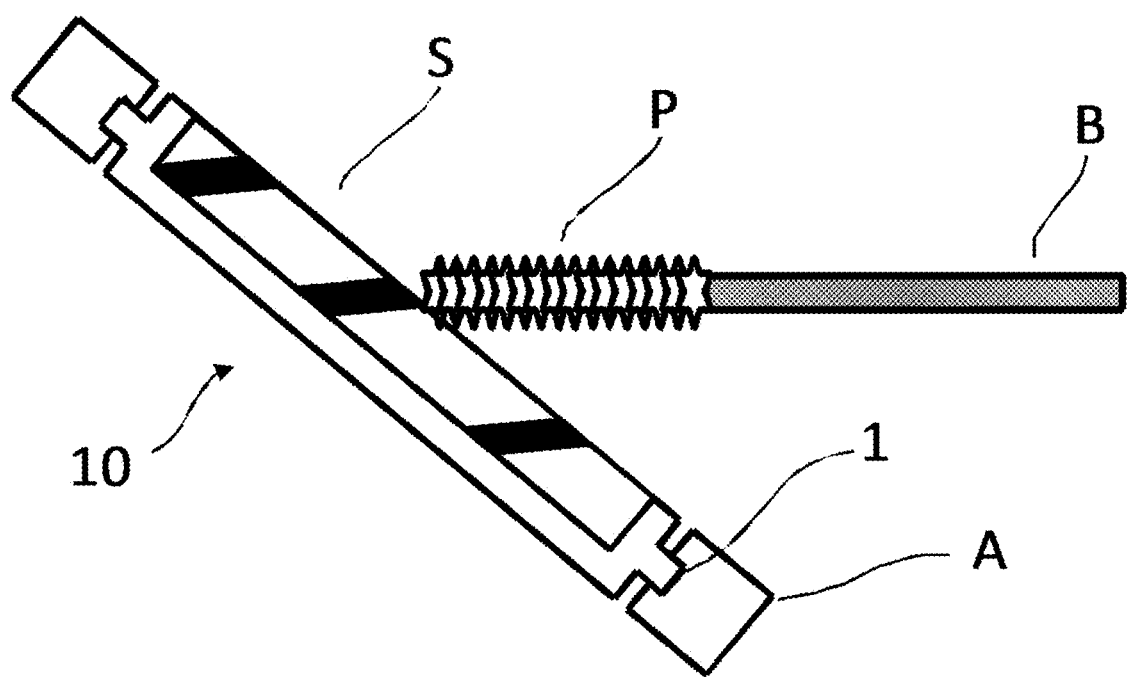
FIG. 4 is an explanatory view showing a state where the polishing face of the polishing jig for machining tools according to the present invention is polished by the processing part of the machining tool.

Other than the above attachment part 1, the polishing jig 10 for machining tools itself may have a shape suitable for being attached to the processing machine M. Examples of this polishing jig 10 for machining tools include a disc-shaped polishing jig 10 for machining tools, for the outer circumference of the side surface of which irregularity such as protrusions and grooves are provided as shown in FIG. 3. At this time, as shown in FIG. 4, force is operated on the irregularity by the fixation part A of the processing machine M, which makes it possible to fix the polishing jig 10.

The polishing face S is formed at least on part of the surface of the polishing jig 10 for machining tools. The polishing face S is a portion with which the processing part of the machining tool can be polished because formed by an abrasive. Here, a position of the polishing face S is not restricted because any processing position can be selected according to setting of the processing machine M. The example shown in FIG. 1 is the polishing jig 10 for machining tool for which the polishing face S is provided on the end part of the columnar attachment part 1 which is in the side opposite to a portion to be attached to the processing machine.

Here, the case where "a surface" of some portion "is formed by an abrasive" includes not only a case where this portion is formed by an abrasive, but also a case where a member or layer that consists of an abrasive is fixed to the surface of the portion.

Examples of the abrasive include a material that is made by dispersing abrasive grains in binder, and solidifying the dispersed abrasive grains along with the binder.

These abrasive grains are not restricted. Examples of the abrasive grains include cerium oxide ($CeO_2$), alumina ($Al_2O_3$), silicon carbide (SiC), silicon oxide ($SiO_2$), zirconia ($ZrO_2$), iron oxides (FeO, $Fe_3O_4$), manganese oxides ($MnO_2$, $Mn_2O_3$), magnesium oxide (MgO), calcium oxide (CaO), barium oxide (BaO), zinc oxide (ZnO), baron nitride (BN), barium carbonate ($BaCO_3$), calcium carbonate ($CaCO_3$) and diamond (C). At least one of them may be used.

The number average grain size of the abrasive grains is preferably 1 to 300 μm, and more preferably 2 to 250 μm. Here, the number average grain size means grain size corresponding to an integrated value at 50% in grain diameter distribution measured using laser diffraction.

The binder is not restricted. Examples of the binder include resins and glasses. At least one of them may be used.

The volume ratio of the abrasive grains in the abrasive is preferably 5 to 90%.

The abrasive can be also a commercially available product such as a grinding block. Examples of such an abrasive include a carborundum grinder.

Further, the polishing jig 10 for machining tools preferably has a block part 3.

The block part 3 is a portion like a block which is fixed to the attachment part 1. A shape of the block part 3 is not restricted. Examples of the shape include columnar, and quadrangular and polygonal columnar shapes. An edge portion of this block part may be subjected to processing such as corner chamfering and round chamfering.

A method of fixing the block part 3 to the attachment part 1 is not restricted. Examples of the method include bonding, welding, and fitting. In the example shown in FIG. 5, the quadrangular columnar block part 3 is bonded and fixed to a face of the columnar attachment part 1 which is in the side opposite to the portion to be attached to the processing machine. In the example shown in FIG. 6, the attachment part 1 is composed of two members that are a member 1' and a member 1" which are welded and fixed to each other. The quadrangular columnar block part 3 is bonded and fixed to a face of the member 1" which is in the side opposite to the member 1'.

Figure 5:
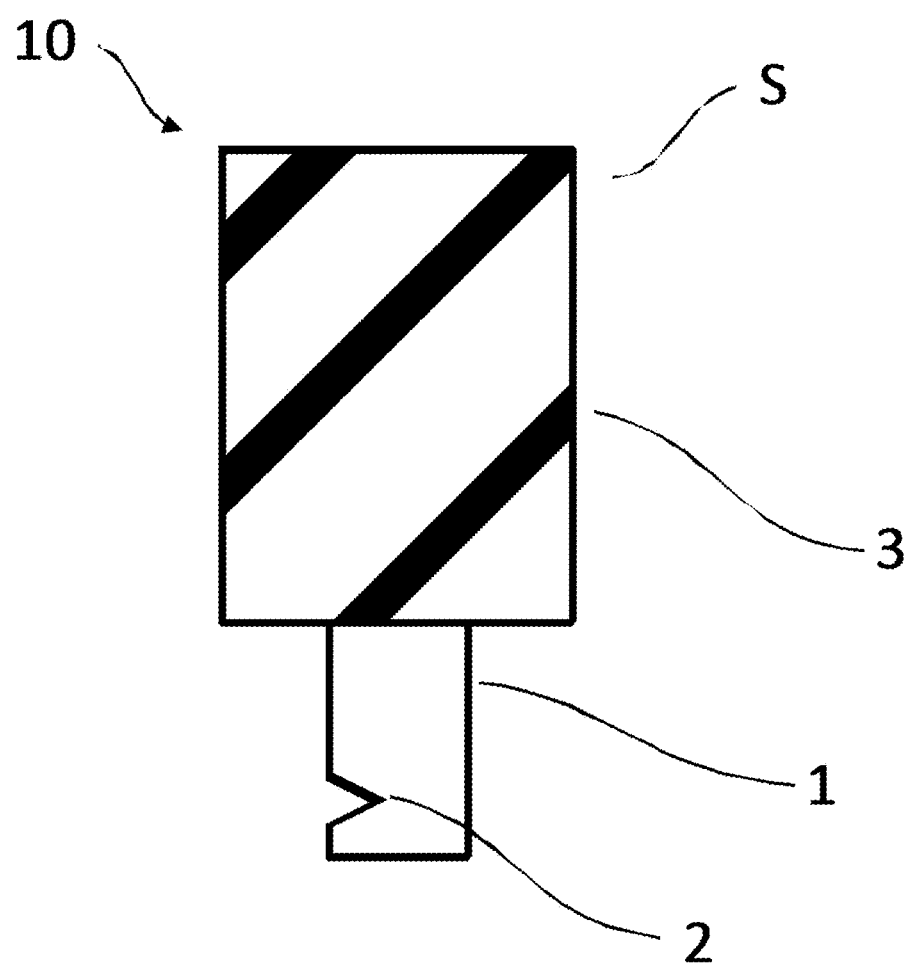
FIG. 5 is an explanatory view showing another embodiment of the polishing jig for the machining tools according to the present invention.
Figure 7:
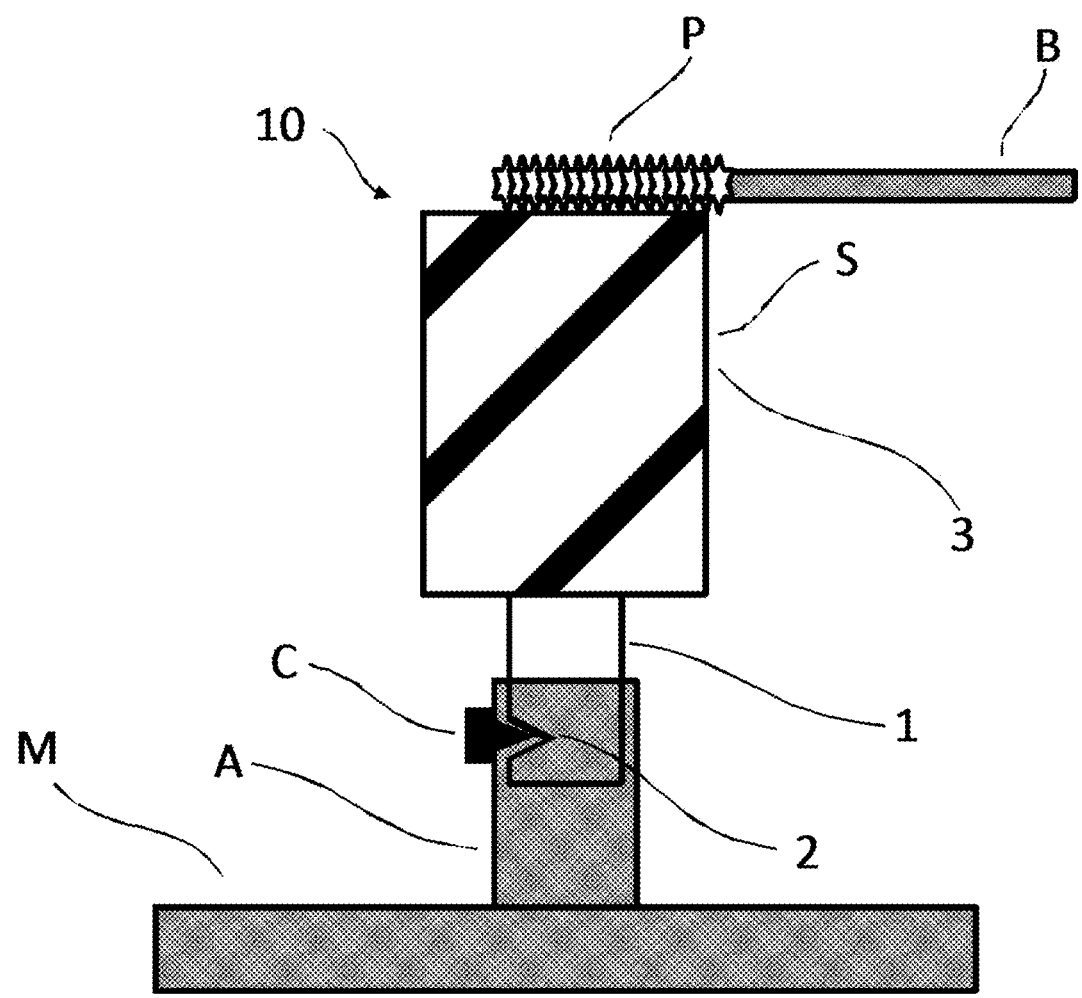
FIG. 7 is an explanatory view showing a state where the polishing face of the polishing jig for machining tools according to the present invention is polished by the processing part of the machining tool.

FIG. 7 exemplifies the polishing jig 10 for machining tools shown in FIG. 5 attached to the processing machine M. As shown, the block part 3 is a potion easy to touch the processing part P of the machining tool B of the processing machine M when the polishing jig 10 for machining tools is attached to the fixation part A of the processing machine M.

A material of the block part 3 can be selected appropriately. Examples of the material include a block formed by the above described abrasive. At this time, all the faces of the block part 3 is the polishing faces S. The example shown in FIG. 5 is the polishing jig 10 for machining tools having the columnar attachment part 1 that is formed by a metallic material, and the quadrangular columnar block part 3 that is formed by the abrasive and is fixed to the attachment part 1.

Figure 6:
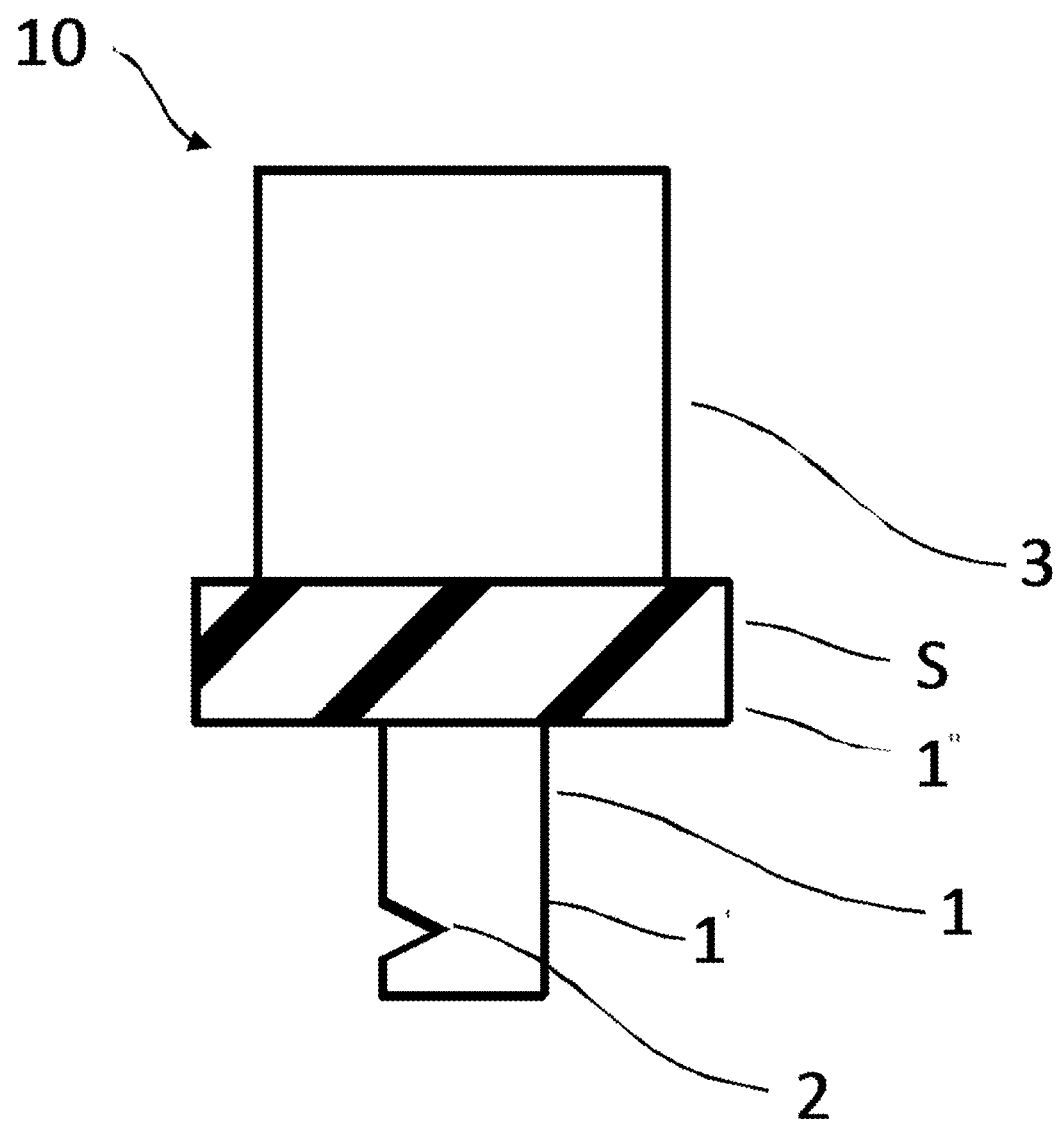
FIG. 6 is an explanatory view showing another embodiment of the polishing jig for machining tools according to the present invention.

The material of the block part 3 may be a material for dental prostheses. Materials for dental prostheses are materials using which dental prostheses can be produced by processing. Examples of the material include resins, glasses, ceramics, and glass ceramics. In this case, it is only needed to provide the polishing face S for any member other than the block part 3. The example shown in FIG. 6 is the polishing jig 10 for machining tools having the columnar attachment part 1 that is formed by the metallic material, and the quadrangular columnar block part 3 that is formed by the material for dental prostheses and is fixed to the attachment part 1, and further, part of the surface of the attachment part 1 that is formed by the abrasive.

Figure 8:
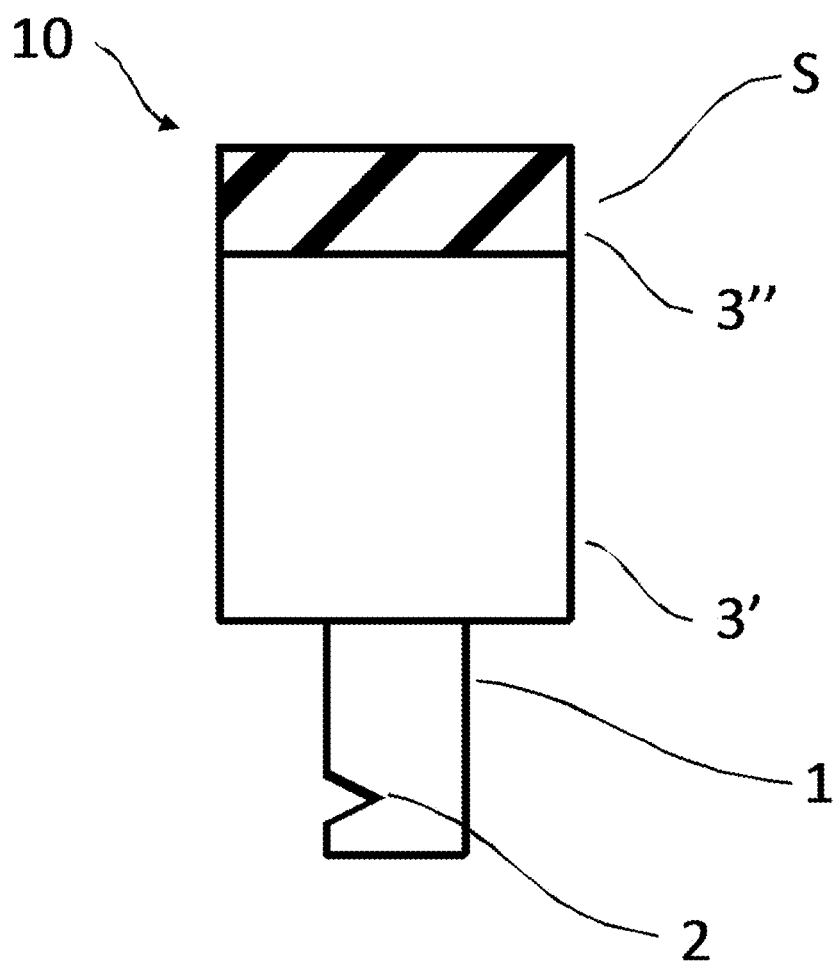
FIG. 8 is an explanatory view showing another embodiment of the polishing jig for machining tools according to the present invention.

The block part 3 made by fixing and integrating a portion formed by the material for dental prostheses and a portion formed by the abrasive may be used. A method of integrating them is not restricted. Examples of this method include bonding, welding, and fitting. The example shown in FIG. 8 is the polishing jig 10 for machining tools having a portion 3' formed by the material for dental prostheses, and a portion 3" formed by the abrasive, which are integrated to compose the quadrangular columnar block part 3, and the columnar attachment part 1 formed by a metallic material which is fixed to a face of the portion 3' formed by the material for dental prostheses which is in the side opposite to the portion 3" formed by the abrasive. That is, the top face of the polishing jig 10 for machining tools is the polishing face S.

Figure 9:
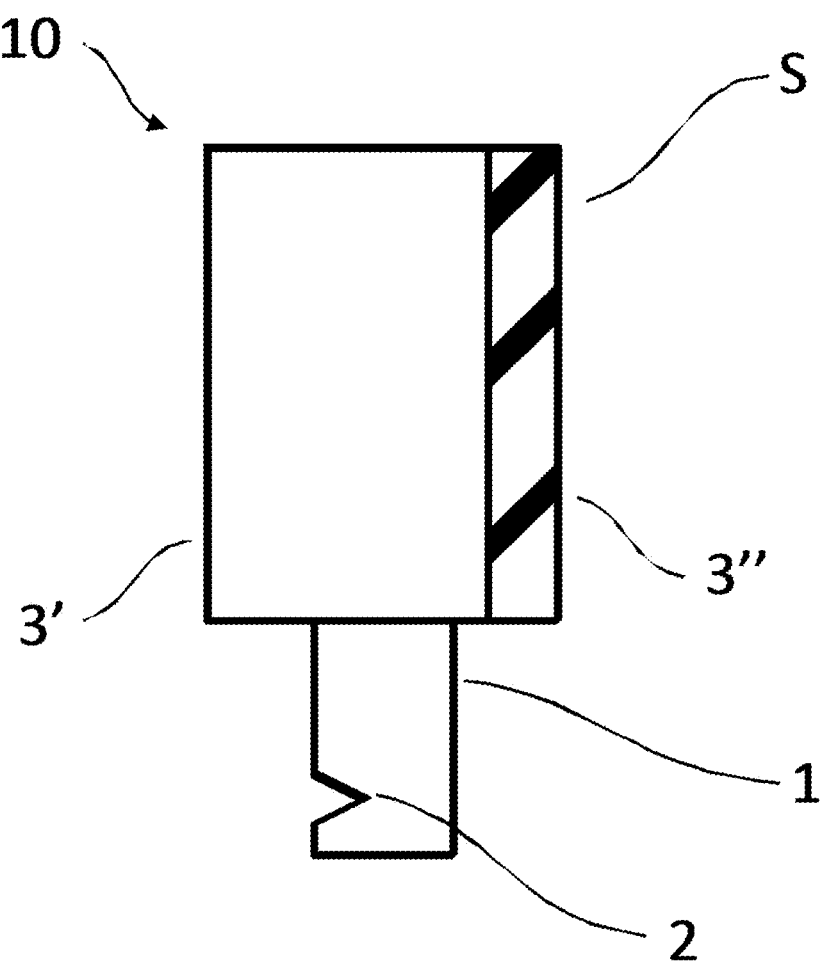
FIG. 9 is an explanatory view showing another embodiment of the polishing jig for machining tools according to the present invention.

Another embodiment of the block part 3 made by fixing and integrating the portion formed by the material for dental prostheses and the portion formed by the abrasive can be also considered. The example shown in FIG. 9 is the polishing jig 10 for machining tools having the portion 3' formed by the material for dental prostheses, and the portion 3" formed by the abrasive, which are integrated to compose the quadrangular columnar block part 3, and the columnar attachment part 1 formed by a metallic material that is fixed to any of four faces of the portion 3' formed by the material for dental prostheses, other than the face in the side opposite to the portion 3" formed by the abrasive. That is, one face of the side faces of the polishing jig 10 for machining tools is the polishing face S.

Figure 10:
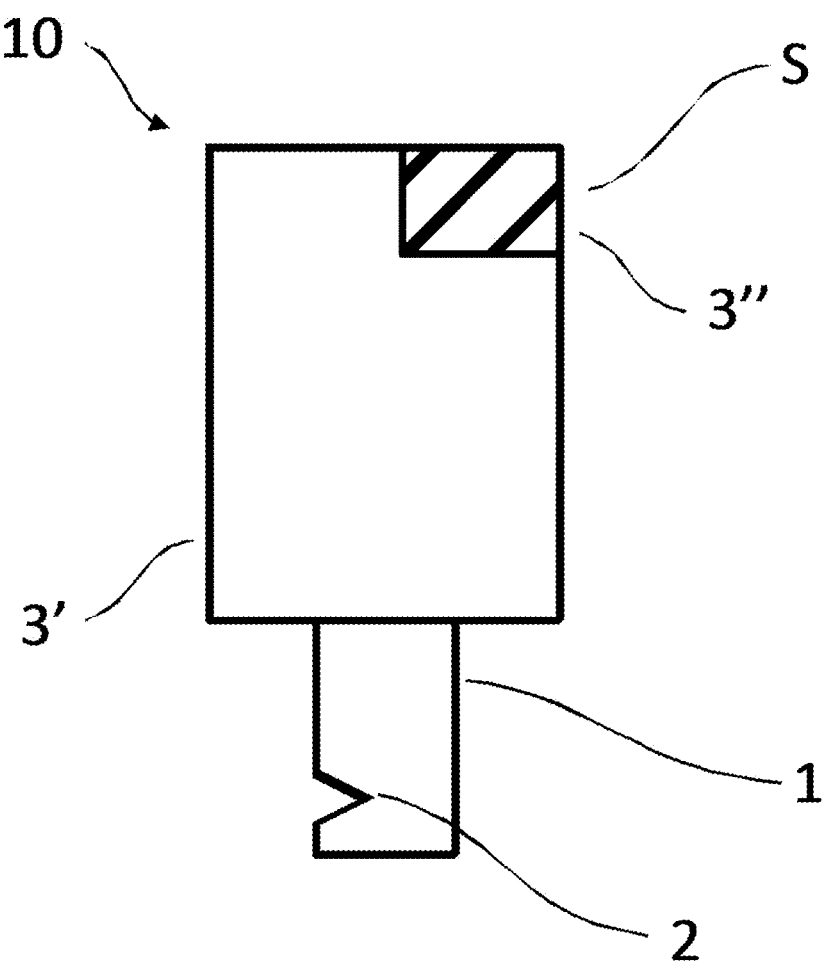
FIG. 10 is an explanatory view showing another embodiment of the polishing jig for machining tools according to the present invention.
Figure 11:
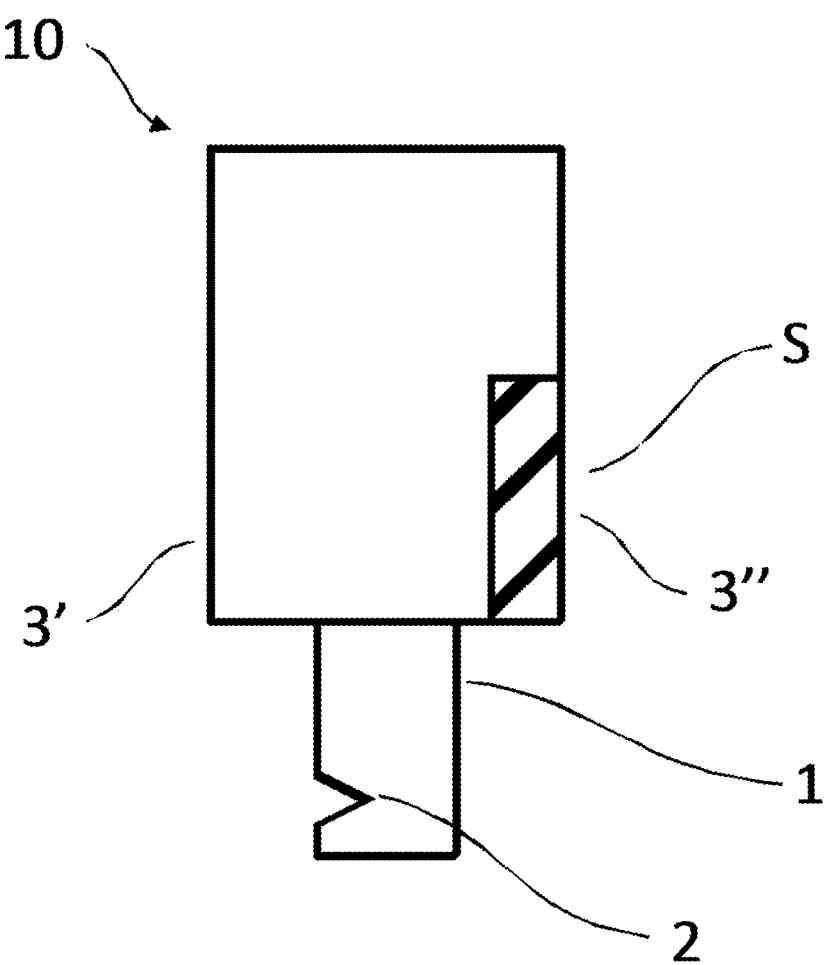
FIG. 11 is an explanatory view showing another embodiment of the polishing jig for machining tools according to the present invention.

The block part 3 made by fixing and integrating the portion formed by the material for dental prostheses and the portion formed by the abrasive may not have a face all of which is the polishing face S as exemplified in FIGS. 10 and 11.

The polishing face S may be provided for another member that is not the attachment part 1 or the block part 3. For example, the example shown in FIG. 6 is the polishing jig 10 for machining tools configured by: the attachment part 1 consisting of two members composed of the columnar member 1' formed by the metallic material, and the member 1" formed by the abrasive, which are welded and fixed to each other; and the quadrangular columnar block part 3 formed by the material for dental prostheses which is bonded and fixed to the face of the member 1" in the side opposite to the member 1'. That is, the surface of the member 1" of the polishing jig 10 for machining tools is the polishing face S.

Next, a method of polishing a machining tool according to one embodiment of the present invention will be described. The present invention is not restricted to this embodiment.

FIG. 2 shows an example of the method of polishing a machining tool using the polishing jig 10 for machining tools shown in FIG. 1. First, the attachment part 1 of the polishing jig 10 for machining tools is fixed to the fixation part A of the processing machine M. At this time, the attachment part 1 can be more firmly fixed by tightening the chuck C such as a screw, which is provided for the fixation part A, so that the chuck C fits the holding part 2, which is provided for the attachment part 1.

Here, the processing machine M is, for example, a cutting machine or grinding machine, and preferably a dental processing machine for producing dental prostheses. Examples of the processing machine M include a dental CAM machine of automatically processing to obtain a desired shape of a dental prostheses based on electronic data of the shape.

The processing machine M is equipped with the machining tool B. The machining tool B is, for example, a cutting tool or grinding tool. Examples of the machining tool B include a dental diamond burr. Here, a diamond burr is a machining tool having a number of fine diamond particles adhering to the circumferential surface of a tip portion of a stick member thereof which is formed by metal or the like. Here, the processing machine M is equipped with the machining tool B, the processing part P of which deteriorates, and a cutting performance of which worsens due to processing in advance.

Next, the processing machine M is operated, to drive the processing part P of the machining tool B onto the polishing face S, which is provided for the end part of the columnar attachment part 1 of the polishing jig 10 for machining tools which is in the side opposite to the portion to be attached to the processing machine. Whereby, the machining tool B can be polished. Here, driving requirements such as a position, time, and rotation speed for polishing can be freely set, using a computer connected to the processing machine M. Not manual but automatic polishing can be performed.

According to such polishing, the deteriorating machining tool B is polished, its cutting performance is recovered, and the machining tool B can be used again. Reasons for this are considered that in the case of using a diamond burr, swarf clogging among a number of fine diamond particles is removed by polishing, and that round tips of fine diamond particles are sharpened by polishing.

Figure 12:
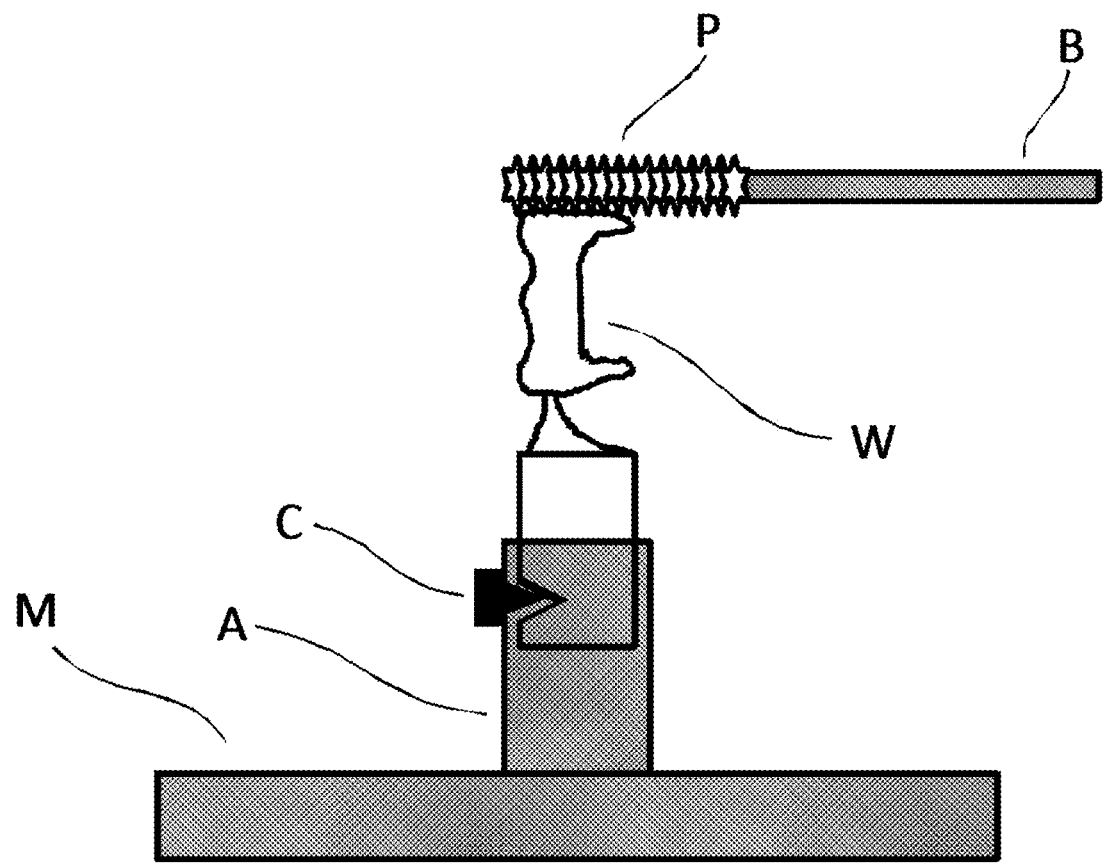
FIG. 12 is an explanatory view showing a state where a dental prosthesis W is produced.

After polishing, the polishing jig 10 for machining tools is detached from the processing machine M, and an unprocessed block that is formed by the material for dental prostheses is newly processed. Whereby, a dental prostheses W can be produced as shown in FIG. 12.

FIG. 7 shows an example of the method of polishing a machining tool using the polishing jig 10 for machining tools shown in FIG. 5, as another example. All the faces of block part 3 of the polishing jig 10 for machining tools is the polishing face S because the block part 3 is formed by the abrasive.

The attachment part 1 of the polishing jig 10 for machining tools is fixed to the fixation part A of the processing machine M as well as the above described example.

Next, the processing machine M is operated, and the polishing face S, which is provided for the block part 3 of the polishing jig 10 for machining tools, is automatically polished with the processing part P of the machining tool B, which deteriorates and a cutting performance of which worsens due to processing in advance.

After polishing, the polishing jig 10 for machining tools is detached from the processing machine M, and an unprocessed block that is formed by the material for dental prostheses is newly processed. Whereby, the dental prostheses W can be produced as shown in FIG. 12.

Figure 13:
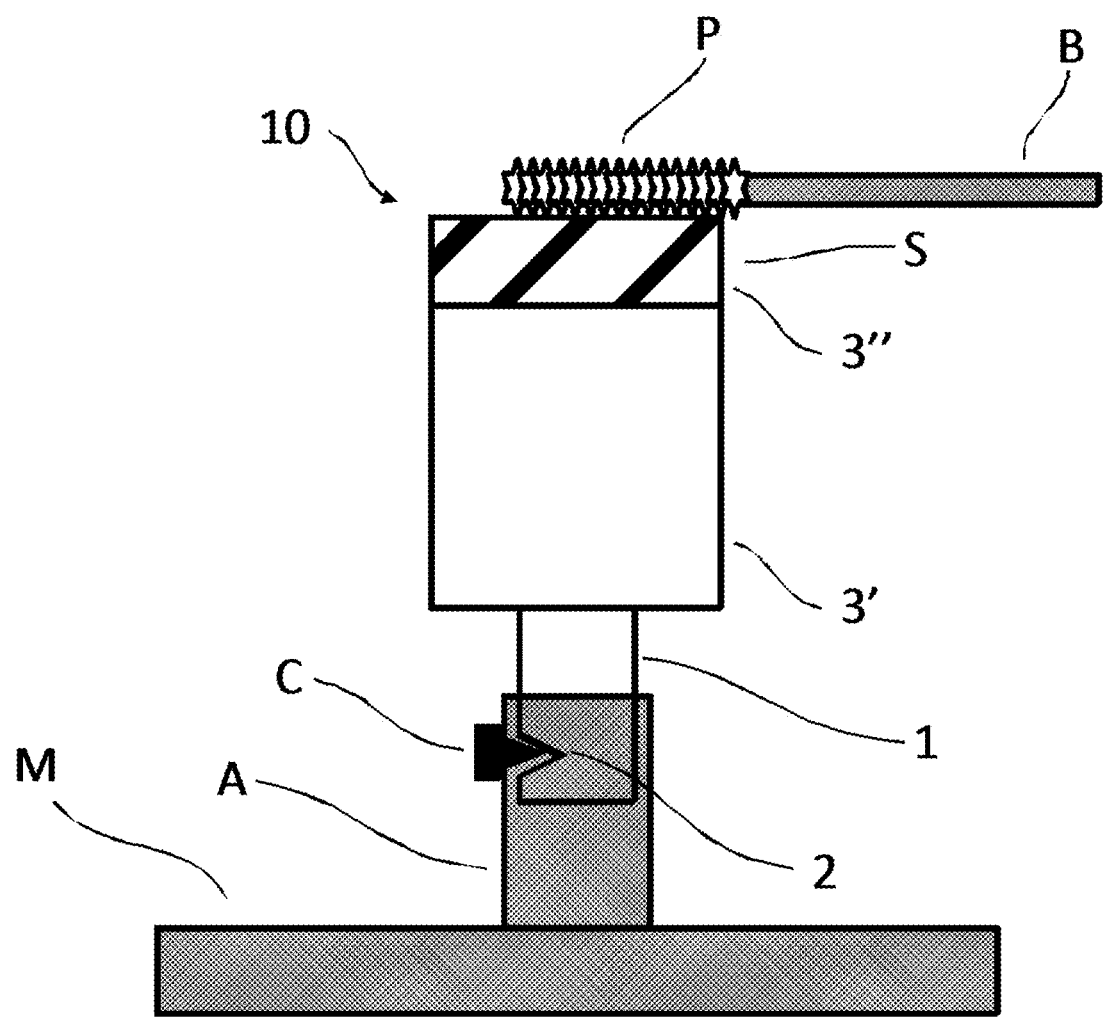
FIG. 13 is an explanatory view showing a state where the polishing face of the polishing jig for machining tools according to the present invention is polished by the processing part of the machining tool.

FIG. 13 shows an example of the method of polishing a machining tool using the polishing jig 10 for machining tools shown in FIG. 8, as still another example. The polishing jig 10 for machining tools has the portion formed by the material for dental prostheses and the portion formed by the abrasive. The portion 3', which is formed by the material for dental prostheses, and the portion 3", which is formed by the abrasive, are integrated, to compose the quadrangular columnar block part 3, and the columnar attachment part 1 formed by the metallic material is fixed to the face of the portion 3' formed by the material for dental prostheses which is in the side opposite to the portion 3" formed by the abrasive. That is, the top face of the block part 3 of the polishing jig 10 for machining tools is the polishing face S.

The attachment part 1 of the polishing jig 10 for machining tools is fixed to the fixation part A of the processing machine M as well as the above described examples.

Next, the processing machine M is operated, and the polishing face S, which is provided for the top face of the block part 3 of the polishing jig 10 for machining tools, is automatically polished with the processing part P of the machining tool B, which deteriorates and a cutting performance of which worsens due to processing in advance.

Figure 14:
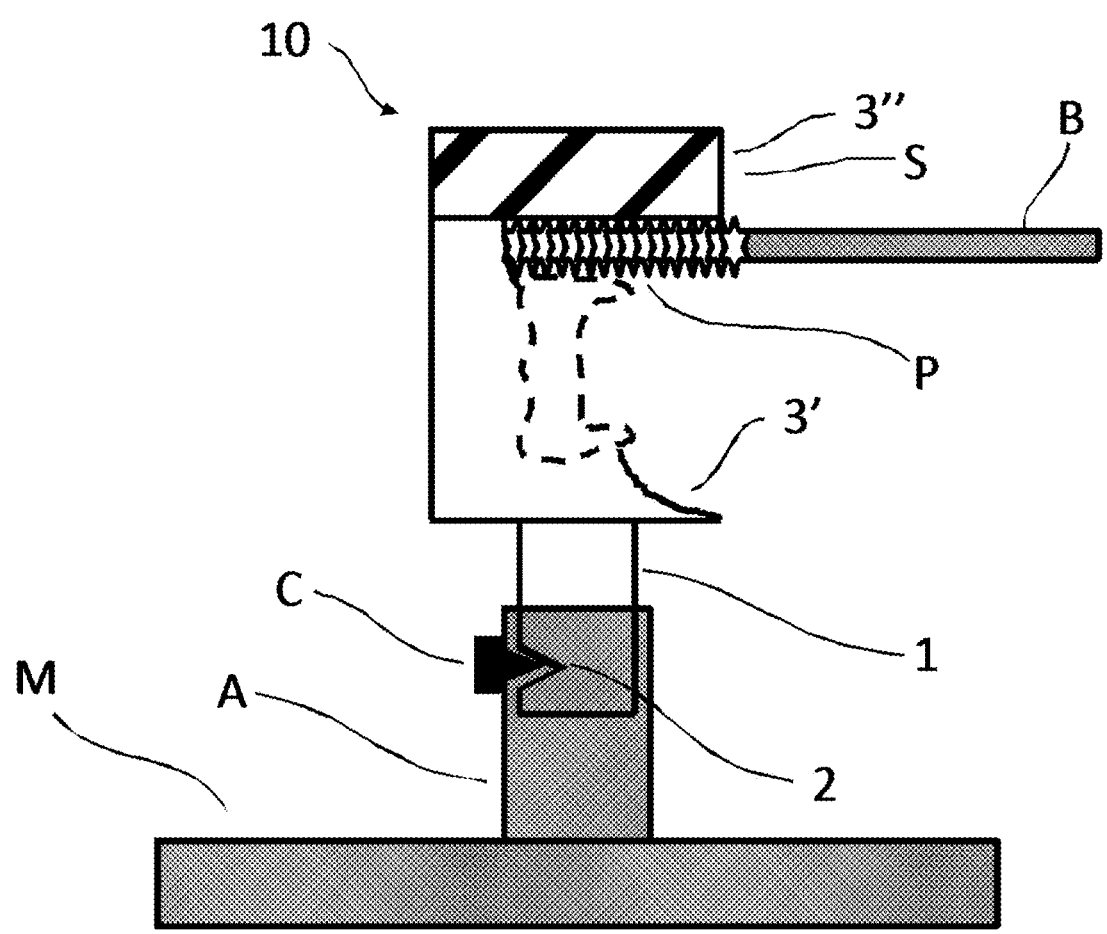
FIG. 14 is an explanatory view showing a state where a portion of the polishing jig for machining tools according to the present invention which is formed by a material for dental prostheses is being processed using the processing part of the machining tool.

Further following the end of polishing without detaching the polishing jig 10 for machining tools from the processing machine M, the portion 3' of the block part 3 of the polishing jig 10 for machining tools, which is formed by the material for dental prostheses, is processed as shown in FIG. 14. Whereby, the dental prostheses W can be produced as shown in FIG. 12.

At this time, the polishing face S can be polished if necessary, to recover the cutting performance of the machining tool B even while the portion formed by the material for dental prostheses is processed. If the polishing face S is not necessary during processing, the portion formed by the abrasive may be removed at this time point.

The polishing face S is polished, which makes it possible to recover the cutting performance of the machining tool B, and to get ready for next processing if the portion formed by the abrasive is not removed after processing on the portion formed by the material for dental prostheses is completed and the dental prostheses W is produced.

As described above, using the polishing jig 10 for machining tool having the portion formed by the material for dental prostheses and the portion formed by the abrasive, the polishing face S is polished and the cutting performance of the machining tool B can be recovered before, while or after the portion formed by the material for dental prostheses is processed. That is, the cutting performance of the machining tool can be recovered and the dental prostheses W can be produced as well with only one polishing jig 10 for machining tools. Thus, the frequency of replacing the polishing jig 10 for machining tools can be decreased, and production efficiency can be improved.

EXAMPLES

Hereinafter the polishing jig for machining tools according to the present invention will be described in more detail with examples. The present invention is not restricted to these examples.

Example 1

<Producing Polishing Jig for Machining Tools>
A polishing jig for machining tools was produced by fixing a grinding block (abrasive grain: alumina, number average grain size: 8 binder: glass, and size: 2 cm×2 cm×2 cm) to an attachment part for a dental CAM processing machine (manufactured by GC corporation, model: Aadva™ Mill LW-I) with adhesive.
<Polishing Machining Tool>
The dental CAM processing machine was equipped with a diamond burr which deteriorated and a cutting performance of which worsened due to processing on a dental glass ceramics block in advance, and the polishing jig for machining tools of the example 1 was fixed to a fixation part of the processing machine. After that, the processing machine was operated according to a program that was set in advance, and a processing part of the diamond burr was touched to a polishing face of the polishing jig for machining tools while being rotated, to be polished automatically.
<Processing of Dental Prosthesis>
Next, an unprocessed block that was formed by a material for dental prostheses was fixed to the fixation part of the processing machine, and a dental glass ceramic block was processed using the polished diamond burr. Then, a dental prostheses W was able to be produced.

Example 2

<Producing Polishing Jig for Machining Tools>
A polishing jig for machining tools was produced by fixing a grinding block to a face of a dental glass ceramic block that had an attachment part for a dental CAM processing machine, which was in the side opposite to the attachment part, with adhesive.
<Polishing Machining Tool>
The dental CAM processing machine was equipped with a diamond burr which deteriorated and a cutting performance of which worsened due to processing on a dental glass ceramics block in advance, and the polishing jig for machining tools of the example 2 was fixed to a fixation part of the processing machine. After that, the processing machine was operated according to a program that was set in advance, and a processing part of the diamond burr was touched to a polishing face of the polishing jig for machining tools while being rotated, to be polished automatically.
<Processing of Dental Prosthesis>
Following the above, a block portion of the polishing jig for machining tools which was formed by the dental glass ceramic block was processed using the polished diamond burr. Then, the dental prostheses W was able to be produced.

Comparative Example 1

A dental CAM processing machine was equipped with a diamond burr which deteriorated and a cutting performance of which worsened due to processing on a dental glass ceramics block in advance, an unprocessed block that was formed by a material for dental prostheses was fixed to a fixation part of the processing machine, and a dental glass ceramic block was processed. Then, some error caused by a bad cutting performance of the machining tool cropped up, and the dental prostheses W was not able to be produced.

REFERENCE SIGNS LIST

1 attachment part
1' member
1" member
2 holding part
3 block part
3' portion
3" portion
10 polishing jig for machining tools
S polishing face
M processing machine
A fixation part
C chuck
B machining tool
P processing part

What is claimed is:

1. A method of forming a dental prosthesis, the method comprising:
- attaching a polishing jig for a cutting tool or a grinding tool to a processing machine, the polishing jig including: an attachment part to be attached to a fixation part of the processing machine; and a block part arranged on one end of the attachment part, wherein the block part has a polishing face that is at least part of a surface thereof, the polishing face adapted to polish a processing part of the cutting tool or the grinding tool;
- polishing the cutting tool or the grinding tool by rotating the processing part of the cutting tool or the grinding tool with which the processing machine is equipped onto the polishing face of the polishing jig;
- detaching the polishing jig, which is attached to the processing machine at the fixation part, from the processing machine, and attaching a block that is formed of a material for the dental prosthesis to the fixation part of the processing machine from where the polishing jig was detached; and
- producing the dental prosthesis by processing the block.

* * * * *